US012350711B2

(12) United States Patent
Kojima

(10) Patent No.: US 12,350,711 B2
(45) Date of Patent: Jul. 8, 2025

(54) ULTRASONIC ELEMENT AND ULTRASONIC DEVICE

(71) Applicant: SEIKO EPSON CORPORATION, Tokyo (JP)

(72) Inventor: Chikara Kojima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 875 days.

(21) Appl. No.: 17/552,344

(22) Filed: Dec. 15, 2021

(65) Prior Publication Data

US 2022/0184661 A1 Jun. 16, 2022

(30) Foreign Application Priority Data

Dec. 15, 2020 (JP) ................................ 2020-207380

(51) Int. Cl.
*B06B 1/06* (2006.01)
*B06B 1/02* (2006.01)

(52) U.S. Cl.
CPC .......... *B06B 1/0644* (2013.01); *B06B 1/0207* (2013.01); *B06B 1/0696* (2013.01)

(58) Field of Classification Search
CPC ... B06B 1/0644; B06B 1/0696; B06B 1/0207; B06B 1/06; B06B 1/0603
USPC ................................................. 310/322, 334
See application file for complete search history.

(56) References Cited

U.S. PATENT DOCUMENTS 11,594,670 B2 2/2023 Kojima et al.
2006/0043843 A1* 3/2006 Sugiura .................. G01S 7/521 310/348
2009/0168603 A1 7/2009 Okuda et al.
2015/0094590 A1* 4/2015 Kiyose ................. B06B 1/0629 600/447

(Continued)

FOREIGN PATENT DOCUMENTS

JP 2009225419 A 10/2009
JP 2015188208 A 10/2015
JP 2020155928 A 9/2020

OTHER PUBLICATIONS

Office Action for JP Patent Application No. JP2020207380, issued on Jun. 18, 2024, 7 pages.

*Primary Examiner* — Derek J Rosenau
(74) *Attorney, Agent, or Firm* — CHIP LAW GROUP

(57) ABSTRACT

An ultrasonic element includes a substrate in which an opening is formed, a vibrating plate provided at the substrate, the vibrating plate including a first surface in contact with the substrate, the vibrating plate blocking the opening, a piezoelectric element provided at a second surface on an opposite side from the first surface of the vibrating plate, a protective substrate facing the second surface and protecting the piezoelectric element, and a suppressing unit provided between the protective substrate and the vibrating plate, the suppressing unit being configured to suppress a vibration of the vibrating plate, in which in the piezoelectric element, a first electrode, a piezoelectric layer, and a second electrode are stacked in this order from the second surface, and an active part is a part of the vibrating plate where the first electrode, the piezoelectric layer, and the second electrode overlap, the suppressing unit is provided around the active part, and a slit is formed in the suppressing unit, in plan view from a stacking direction.

5 Claims, 13 Drawing Sheets

(56) References Cited

U.S. PATENT DOCUMENTS

| | | | | |
|---|---|---|---|---|
| 2015/0258573 | A1 | 9/2015 | Kojima | |
| 2018/0326455 | A1* | 11/2018 | Ohashi | B06B 1/067 |
| 2020/0303618 | A1 | 9/2020 | Kojima et al. | |

* cited by examiner

ULTRASONIC ELEMENT AND ULTRASONIC DEVICE

The present application is based on, and claims priority from JP Application Serial Number 2020-207380, filed Dec. 15, 2020, the disclosure of which is hereby incorporated by reference herein in its entirety.

BACKGROUND

1. Technical Field

The present disclosure relates to an ultrasonic element and an ultrasonic device.

2. Related Art

In the related art, there is known an ultrasonic element in which piezoelectric elements are arrayed in a matrix pattern. There is disclosed, in JP 2015-188208 A, an ultrasonic element including a silicon substrate having an opening, a vibrating plate sealing the opening, and a piezoelectric element disposed at the vibrating plate and clamping the piezoelectric body with electrodes, for example.

According to the above, the vibrating plate and a sealing plate are arranged facing each other. A suppressing unit having a grid-like shape is disposed between the vibrating plate and the sealing plate, and the piezoelectric element is disposed in a sealed space enclosed by the suppressing unit. The suppressing unit limits the range in which the vibrating plate vibrates. The frequency at which the vibrating plate vibrates is set according to the size of the vibrating plate enclosed by the suppressing unit.

The sealed space enclosed by the vibrating plate, the sealing plate, and the suppressing unit is filled with atmospheric pressure air. When the ultrasonic element is depressurized with vacuum equipment in order to form the opening in the silicon substrate during a manufacturing step of the ultrasonic element, air inside the sealed space presses against the vibrating plate. At this time, there is an issue in that the vibrating plate is damaged. Also, in the ultrasonic element in which a space enclosed by the suppressing unit is sealed, the air pressure inside the sealed space changes due to the deformation of the vibrating plate. The energy for the piezoelectric element to cause the vibrating plate to vibrate is consumed for changing the air pressure in the sealed space, resulting in an issue in that the vibrating plate is not efficiently caused to vibrate.

SUMMARY

An ultrasonic element includes a substrate in which an opening is formed, a vibrating plate provided at the substrate, the vibrating plate including a first surface in contact with the substrate, the vibrating plate blocking the opening, a piezoelectric element provided at a second surface on an opposite side from the first surface of the vibrating plate, a protective substrate facing the second surface and protecting the piezoelectric element, and a suppressing unit provided between the protective substrate and the vibrating plate, the suppressing unit being configured to suppress a vibration of the vibrating plate, in which in the piezoelectric element, a first electrode, a piezoelectric layer, and a second electrode are stacked in this order from the second surface, and an active part is a part of the vibrating plate where the first electrode, the piezoelectric layer, and the second electrode overlap is designated as an active part, the suppressing unit is provided around the active part and a slit is formed in the suppressing unit, in plan view from a stacking direction.

An ultrasonic element includes a substrate in which an opening is formed, a vibrating plate provided at the substrate, the vibrating plate including a first surface in contact with the substrate, the vibrating plate blocking the opening, a piezoelectric element provided at a second surface on an opposite side from the first surface of the vibrating plate, a protective substrate facing the second surface and protecting the piezoelectric element, and a suppressing unit provided between the protective substrate and the vibrating plate, the suppressing unit being configured to suppress a vibration of the vibrating plate, in which in the piezoelectric element, a first electrode, a piezoelectric layer, and a second electrode are stacked in this order from the second surface, and an active part is a part of the vibrating plate where the first electrode, the piezoelectric layer, and the second electrode overlap is designated as an active part, the suppressing unit is provided around the active part and a slit is formed in the protective substrate, in plan view from a stacking direction.

An ultrasonic device includes the ultrasonic element described above and a drive circuit that inputs a drive signal to the piezoelectric element.

DESCRIPTION OF EXEMPLARY EMBODIMENTS

Figure 1:
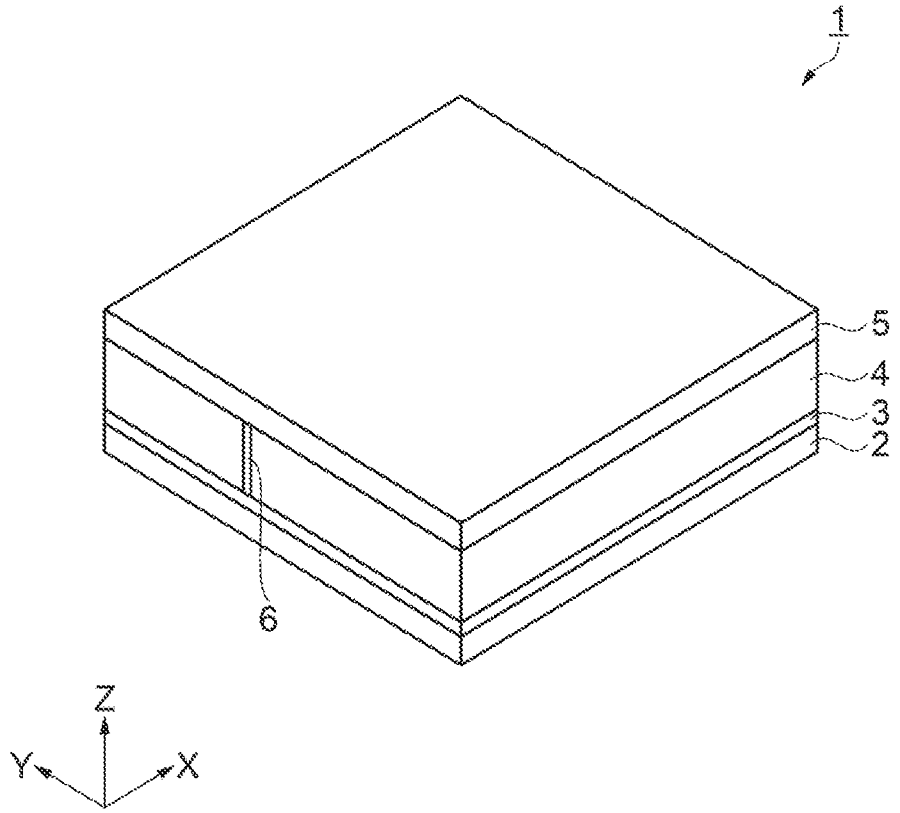
FIG. 1 is a schematic view illustrating a configuration of an ultrasonic element according to the first embodiment.

In the following, embodiments will be described with reference to the drawings. Note that the scales of the members in the drawings are suitably changed for each of the members in order to illustrate each member in the drawings in a recognizable size.

First Embodiment

In the first embodiment, a distinguishing example of a ultrasonic element is described with reference to FIGS. 1 to 6. An ultrasonic element 1 includes a substrate 2, as illustrated in FIG. 1. A vibrating plate 3, a suppressing unit 4, and a protective substrate 5 are disposed overlapped on the substrate 2. The ultrasonic element 1 has a quadrangular plate shape. The direction along two sides of the square is designated as an X direction and a Y direction. The thickness direction of the ultrasonic element 1 is designated as a Z direction. The vibrating plate 3 vibrates, and by which ultrasonic waves are transmitted to the negative side in the Z direction. The materials of the substrate 2 and the protective substrate 5 contain silicon. The material of the vibrating plate 3 contains silicon dioxide and zirconium dioxide. The material of the suppressing unit 4 contains a resin material. The suppressing unit 4 includes a ventilation hole 6 at a surface on the negative side in the X direction. The ventilation hole 6 causes the air pressure in the space formed inside the ultrasonic element 1 to be atmospheric pressure.

Figure 2:
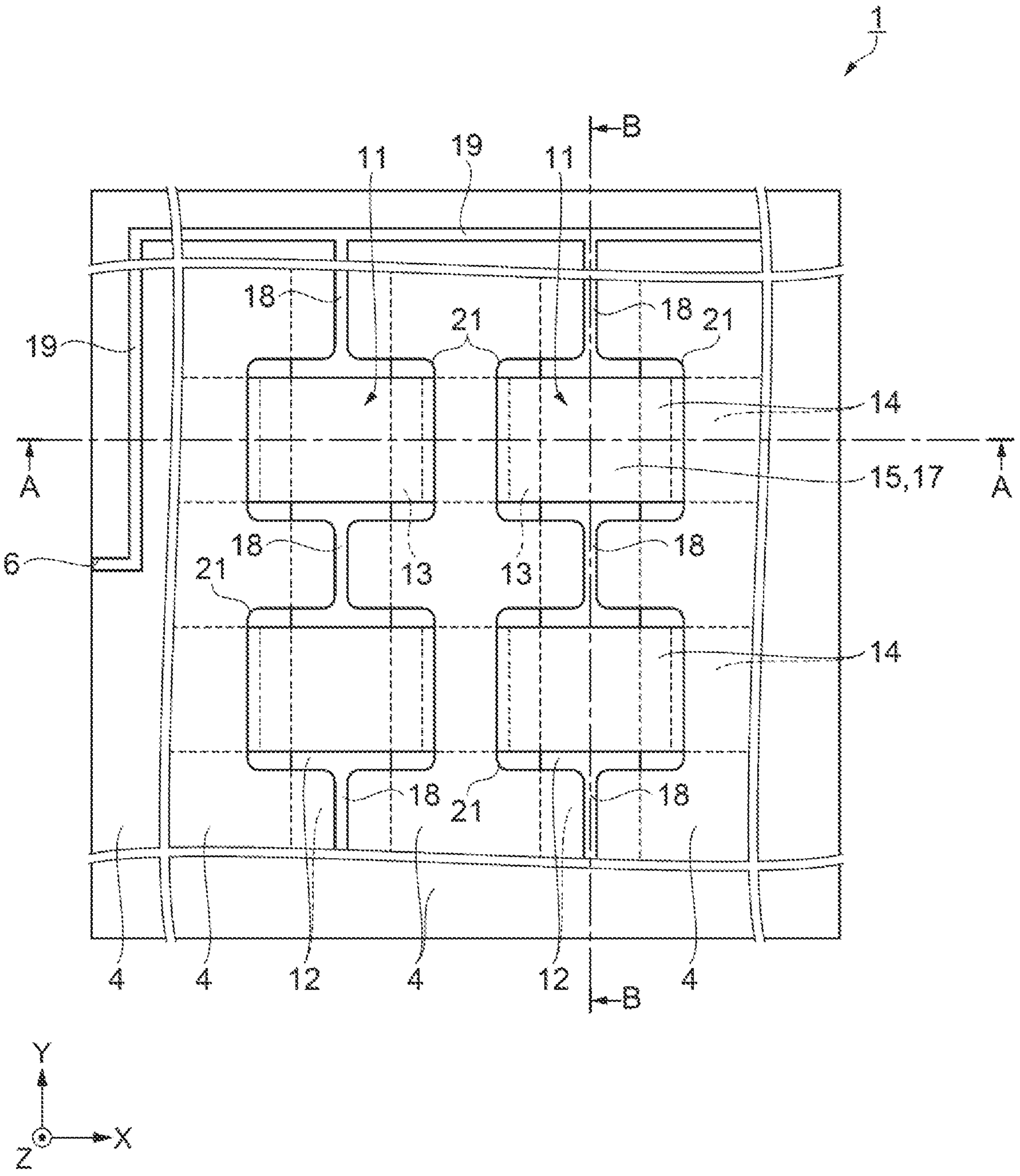
FIG. 2 is a schematic plan view illustrating an internal structure of an ultrasonic element.
Figure 3:
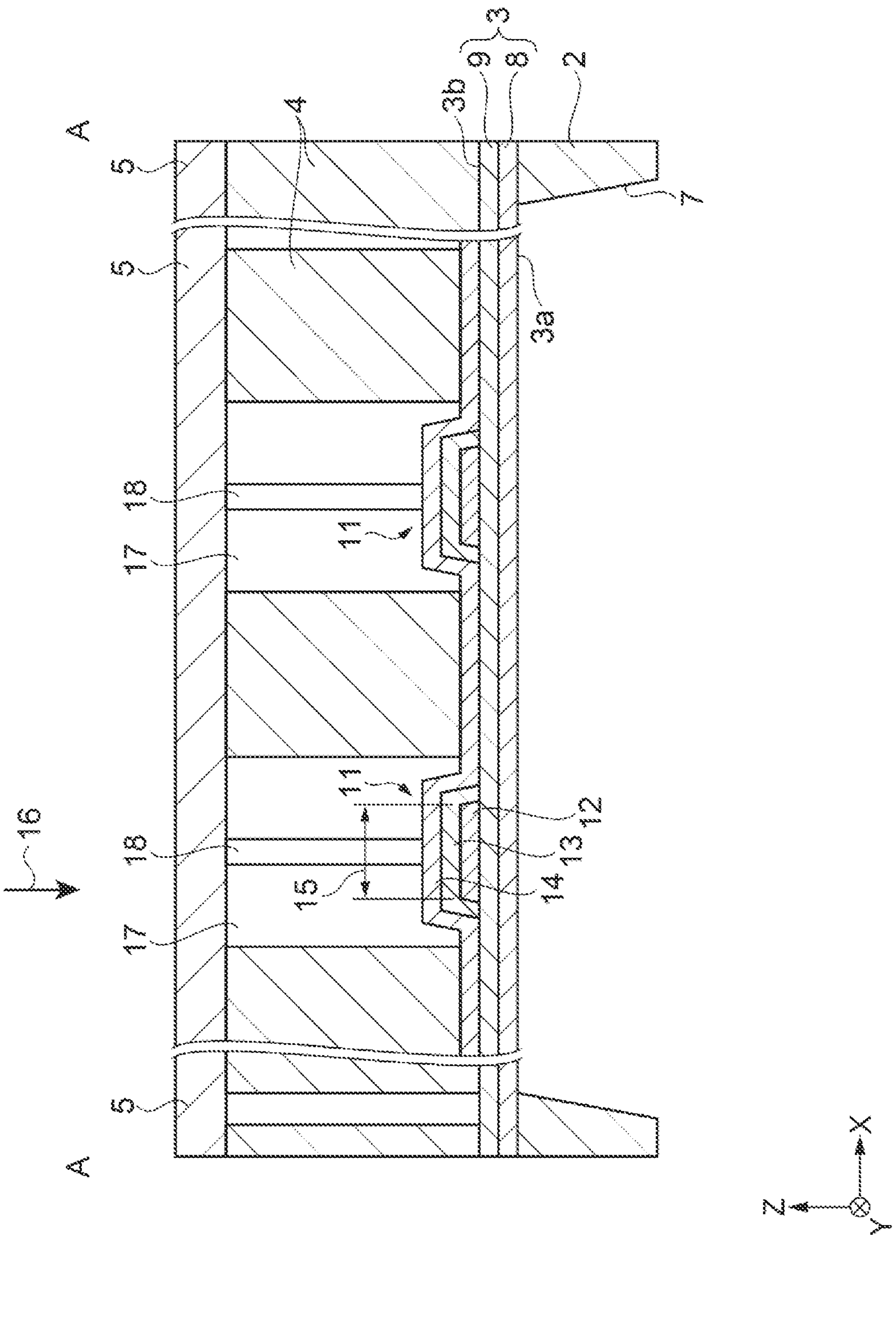
FIG. 3 is a schematic side sectional view illustrating an internal structure of an ultrasonic element.
Figure 4:
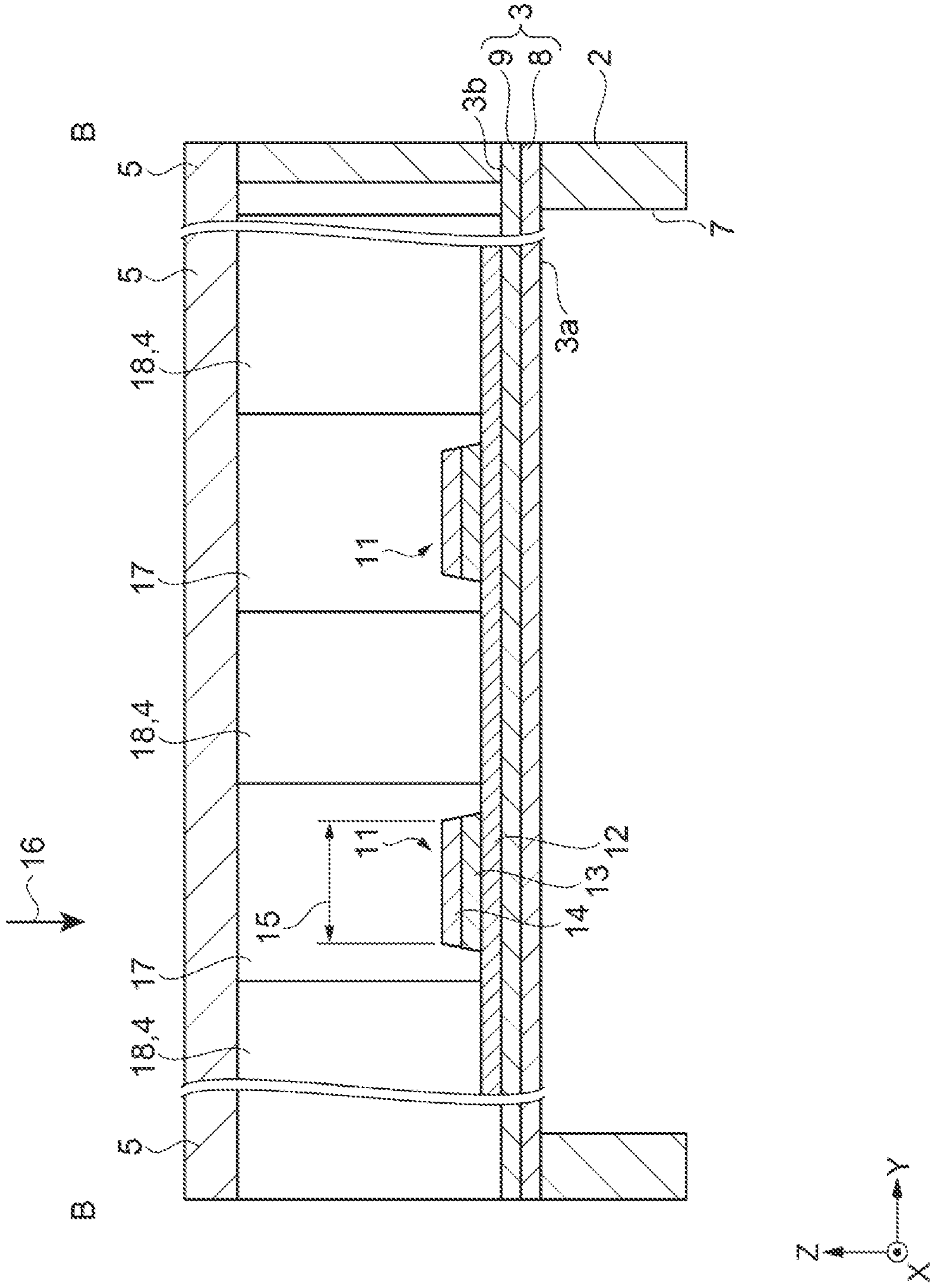
FIG. 4 is a schematic side sectional view illustrating an internal structure of an ultrasonic element.

FIG. 2 is a view of the ultrasonic element 1 from which the protective substrate 5 is removed. FIG. 3 is a view from the side of cross-section along the line AA in FIG. 2. FIG. 4 is a view from the side of cross-section along the line BB in FIG. 2.

An opening 7 is formed in the substrate 2, where the substrate 2 is formed in a frame shape, as illustrated in FIGS. 2 to 4. The vibrating plate 3 blocking the opening 7 is provided at the substrate 2. The vibrating plate 3 includes a first surface 3*a* in contact with the substrate 2. The vibrating plate 3 has a structure in which a first vibration member 8 and a second vibration member 9 are stacked together. The material of the first vibration member 8 on the side of the substrate 2 contains silicon dioxide. The material of the second vibration member 9 on the side of the suppressing unit 4 contains zirconium dioxide.

The surface on an opposite side from the first surface 3*a* of the vibrating plate 3 is a second surface 3*b*. The second surface 3*b* is in contact with the suppressing unit 4. Piezoelectric elements 11 are provided in a matrix pattern at the second surface 3*b*. The piezoelectric element 11 includes a first electrode 12, a piezoelectric layer 13, and a second electrode 14 that are stacked in the order from the second surface 3*b*. At the second surface 3*b*, the first electrodes 12 that are long in the Y direction are aligned side-by-side in the X direction. The piezoelectric layers 13 are arranged, at predetermined intervals, on the first electrode 12. The second electrodes 14 that are long in the X direction are aligned side-by-side, overlapping with the piezoelectric layer 13, in the Y direction. The part where the first electrode 12, the piezoelectric layer 13, and the second electrode 14 overlap is designated as an active part 15.

An AC voltage is applied between the first electrode 12 and the second electrode 14. The piezoelectric layer 13 is caused to vibrate according to the AC voltage. The vibrating plate 3 vibrates in response to the vibration of the piezoelectric layer 13. The piezoelectric elements 11 arrayed in a matrix pattern synchronize to cause the vibrating plate 3 to vibrate. Thus, it is possible for the ultrasonic element 1 to transmit ultrasonic waves of high intensity.

The suppressing unit 4 is provided between the protective substrate 5 and the vibrating plate 3. The suppressing unit 4 suppresses the vibration of the vibrating plate 3. The direction in which the second electrode 14, the piezoelectric layer 13, and the first electrode 12 are stacked in the order from the side of the protective substrate 5, that is, a −Z direction, is designated as a stacking direction 16. The suppressing unit 4 is provided around the active part 15 in plan view from the stacking direction 16. The vibration of the vibrating plate 3 is suppressed at a location where the suppressing unit 4 is in contact with the vibrating plate 3.

The vibration mode of the vibrating plate 3 is set by the suppressing unit 4, to thus set the natural vibration frequency of the vibrating plate 3. The space enclosed by the suppressing unit 4 is designated as an internal space 17. The vibrating plate 3 is facilitated to vibrate in the internal space 17. The vibrating plate 3 is prevented from vibrating at the suppressing unit 4. Accordingly, the boundary between the suppressing unit 4 and the internal space 17 serves as a node of the vibrating plate 3.

The protective substrate 5 is disposed on the positive side in the Z direction of the suppressing unit 4. The protective substrate 5 faces the second surface 3*b* and protects the piezoelectric element 11. The internal space 17 is enclosed by the vibrating plate 3, the protective substrate 5, and the suppressing unit 4.

A slit 18 is formed in the suppressing unit 4. An aeration path 19 is formed on the outer peripheral side in the suppressing unit 4. The aeration path 19 communicates with the slit 18 and the ventilation hole 6. Thus, the internal space 17 leads to the outside air through the slit 18, the aeration path 19, and the ventilation hole 6. Accordingly, the air pressure inside the internal space 17 is atmospheric pressure. Note that the slit 18 may have a shape that spaces from the protective substrate 5 to the vibrating plate 3, and may have a shape that spaces from the protective substrate 5 to the middle of the vibrating plate 3. The slit 18 may also have a shape that spaces from the vibrating plate 3 to the middle of the protective substrate 5.

According to the configuration of the ultrasonic element 1, the active part 15 of the piezoelectric element 11 causes the vibrating plate 3 to vibrate. The suppressing unit 4 is disposed around the active part 15. The suppressing unit 4 is interposed between the vibrating plate 3 and the protective substrate 5. The slit 18 is formed in the suppressing unit 4, thus the gas inside the internal space 17 enclosed by the suppressing unit 4 is movable to the outside of the suppressing unit 4. The internal space 17 enclosed by the suppressing unit 4 is not sealed, which makes it possible to efficiently cause the vibrating plate 3 to vibrate.

The face where the suppressing unit 4 faces the active part 15 is shaped in a polygon, and one end of the slit 18 is coupled with a side of the polygon, in plan view from the stacking direction 16. In the first embodiment, the face where the suppressing unit 4 faces the active part 15 is shaped in a quadrangle as one example of the polygon. One end of the slit 18 is coupled with a side of the quadrangle. In addition, the face where the suppressing unit 4 faces the active part 15 may also be shaped in a polygon such as triangle, pentagon, hexagon, or the like.

According to the configuration of the ultrasonic element 1, one end of the slit 18 is coupled with a side of the polygon, which makes it possible to efficiently cause the vibrating plate 3 to vibrate compared to when the one end of the slit 18 is coupled with a corner 21 of the polygon.

The corners 21 of the face having a polygon shape by which the suppressing unit 4 faces the active part 15 are formed in arc shapes. According to this configuration, the corners 21 of the polygon are formed in arc shapes. The suppressing unit 4 is applied in a predetermined shape by diluting a resin material with a solvent. Then, the solvent is removed by drying. A stress is concentrated on the corner 21 when this is angulated, and thus a cracking is likely to occur. The cracking is prevented from occurring when the corner 21 is arc shaped. Thus, it is possible to suppress the occurrence of the cracking at the corner 21 of the suppressing unit 4 compared to when the corners 21 having polygon shapes are formed in angular shapes.

Figure 5:
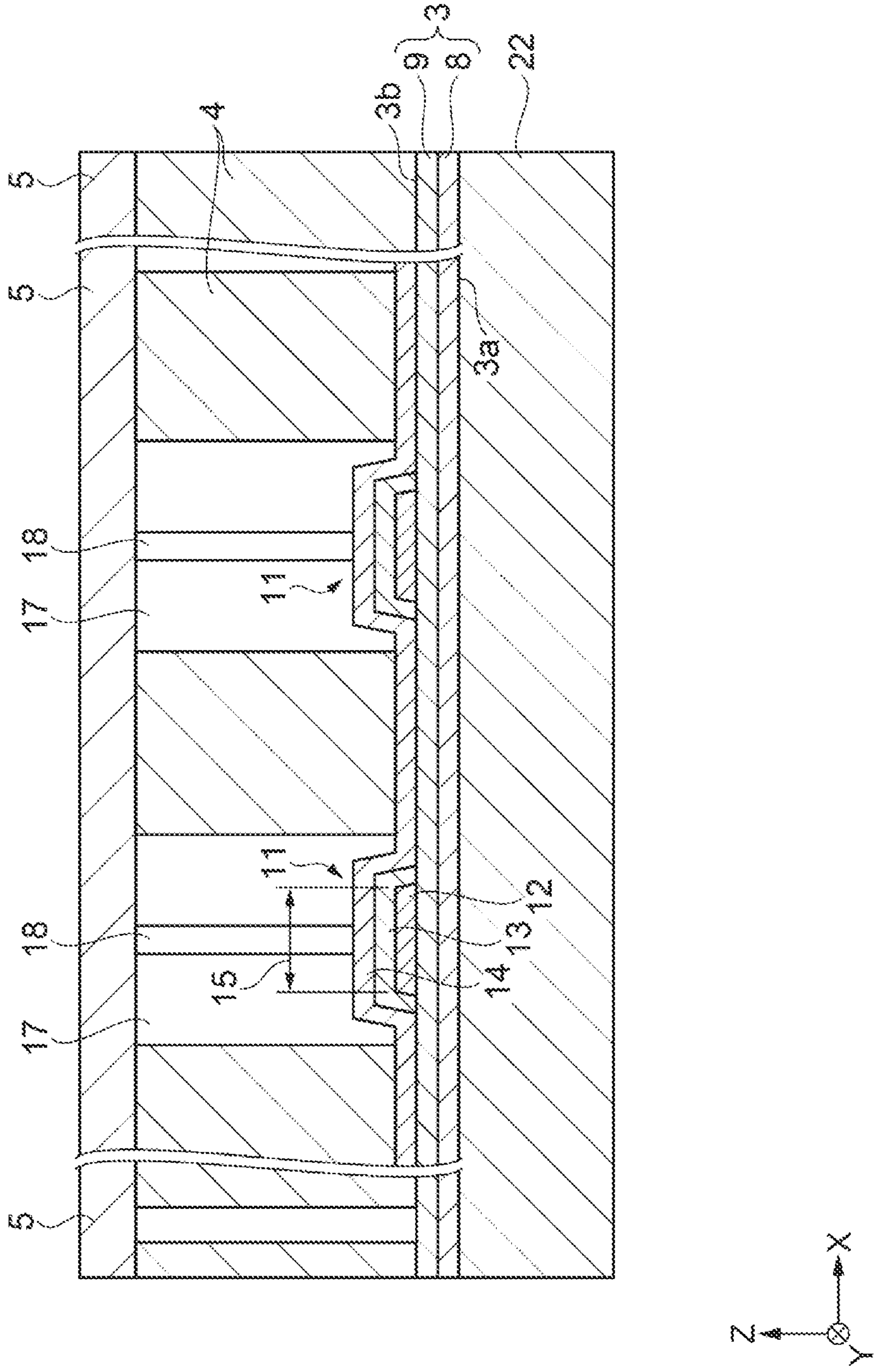
FIG. 5 is an explanatory schematic side sectional view of a manufacturing method for an ultrasonic element.
Figure 6:
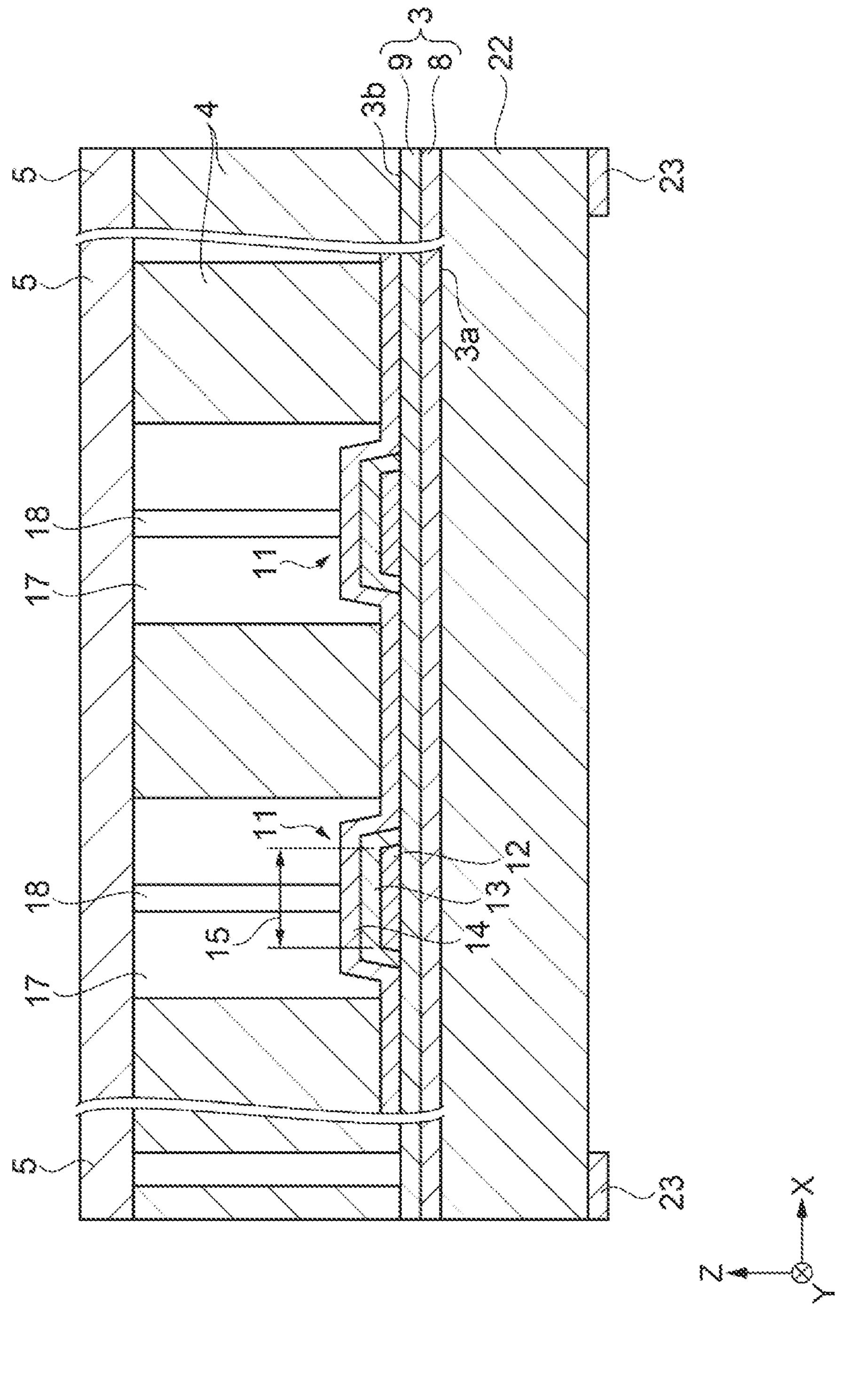
FIG. 6 is an explanatory schematic side sectional view of a manufacturing method for an ultrasonic element.

Next, a manufacturing method for the ultrasonic element 1 will be described with reference to FIGS. 5 and 6. A base member 22 is prepared, as illustrated in FIG. 5. The material of the base member 22 contains silicon. The vibrating plate 3 is disposed on the base member 22. First, by operating a deposition system, a silicon oxide layer ($SiO_2$) is stacked on the surface of the base member 22, and a zirconium oxide layer ($ZrO_2$) is stacked on the surface of the silicon oxide layer. A sputtering method or a chemical vapor deposition (CVD) method may be used as the method for layering the materials.

The first electrode 12 is disposed on the vibrating plate 3. First, a deposition system is operated to dispose a metal film on the vibrating plate 3. In the first embodiment, the metal film is deposited with platinum stacked on iridium oxide, for example. The platinum is also referred to as platinum metal. A sputtering method is used for the method for disposing the metal film.

A photosensitive resist is then disposed on the metal film, and exposure equipment is operated to perform an exposure with overlapping a mask having the shape of the first electrode 12. Next, etching equipment is operated to remove, by etching, a part of the photosensitive resist, and moreover, the metal film is etched with the resist as a mask, and the resist is then removed. As a result, the first electrode 12 is formed on the vibrating plate 3. A dry etching method is used for the etching.

A ferroelectric material layer is then disposed on the first electrode 12. The ferroelectric material layer is a layer that serves as the material of the piezoelectric layer 13, and is a layer of a PZT film. The ferroelectric material layer is disposed using a sol-gel method. In the sol-gel method, a sol is produced that is a hydrated complex of a hydroxide, such as titanium hydroxide, zirconium hydroxide, lead hydroxide, or the like, which serves as a material of the ferroelectric material layer. The sol is applied onto the vibrating plate 3. The sol is dehydrated to produce a gel. A calcination apparatus is operated to heat and calcine the gel to form a gel film containing an inorganic oxide. The application of the sol, the dehydration treatment, and the heat treatment are repeatedly carried out. The gel films are stacked to form the ferroelectric material layer. Next, an annealing apparatus is operated to anneal the ferroelectric material layer to be prepared.

An upper metal film is then disposed. The upper metal film is formed by layering an iridium film, a titanium film, and an iridium film in this order. A sputtering method is used for the method for disposing the upper metal film.

The ferroelectric material layer and the upper metal film are patterned into the shape of the piezoelectric layer 13. The patterning method is the same as in the first electrode 12, and a description thereof is omitted.

The second electrode 14 is then disposed. First, the deposition system is operated to form a metal film. A sputtering method is used for the method for forming the metal film. The metal film is patterned into the shape of the second electrode 14. The patterning method is the same as in the first electrode 12, and a description thereof is omitted.

An inorganic film is disposed overlapped with the first electrode 12, the piezoelectric layer 13, and the second electrode 14. The inorganic film is a film of alumina ($Al_2O_3$), which is formed using an Atomic Layer Deposition (ALD) method. The inorganic film is then patterned into the shape of the first electrode 12 and the second electrode 14. The patterning method is the same as in the first electrode 12, and a description thereof is omitted.

An organic insulating film is then disposed. First, the deposition system is operated to dispose an organic solid film overlapped with the inorganic film. The organic solid film is a photosensitive resin film. A solution in which the photosensitive resin material is dissolved is applied onto the base member 22. A spin coater is used for the application method. A drying apparatus is then operated to dry the solution to remove the solvent.

The organic solid film is then patterned into the shape of the suppressing unit 4. In this step, the slit 18 is formed. The patterning method is the same as in the first electrode 12, and a description thereof is omitted. The suppressing unit 4 is formed on the vibrating plate 3. The slit 18 is formed in the suppressing unit 4. The protective substrate 5 is then adhesively fixed on the suppressing unit 4.

The base member 22 is then patterned to form the opening 7. The deposition system is operated to dispose a film composed of a material of a mask film 23 on the surface, on the negative side in the Z direction, on the base member 22, as illustrated in FIG. 6. Then, the film composed of a material of the mask film 23 is patterned by exposing and developing the film using a photolithography method to form the mask film 23. The mask film 23 is shaped into a planar shape of the opening 7.

The base member 22 is placed inside the chamber of vacuum equipment and the chamber is depressurized when the film composed of the material of the mask film 23 is disposed. The base member 22 is placed inside the chamber of the vacuum equipment and the chamber is depressurized when the film composed of the material of the mask film 23 is patterned as well.

The slit 18 is formed in the suppressing unit 4, thus the gas inside the internal space 17 enclosed by the suppressing unit 4 is movable to the outside of the suppressing unit 4. Thus, the air pressure inside the internal space 17 enclosed by the suppressing unit 4 becomes equal to the air pressure of the outside air, when the ultrasonic element 1 is depressurized. This makes it possible to suppress a damage to the vibrating plate 3 and the base member 22 even when the ultrasonic element 1 is depressurized in the step for manufacturing the ultrasonic element 1.

The base member 22 is then etched with the mask film 23 as a mask. A wet anisotropic etching method is used for the etching method. The vibrating plate 3 functions as an etching stop layer. The mask film 23 is then removed. As a result, the opening 7 is formed in the substrate 2, as illustrated in FIG. 3. The ultrasonic element 1 is completed by the above-described steps.

Second Embodiment

The second embodiment differs from the first embodiment in that a portion corresponding to the slit 18 is formed in the protective substrate 5. Note that configurations identical to those in the first embodiment will be denoted by identical reference signs and redundant descriptions will be omitted.

Figure 7:
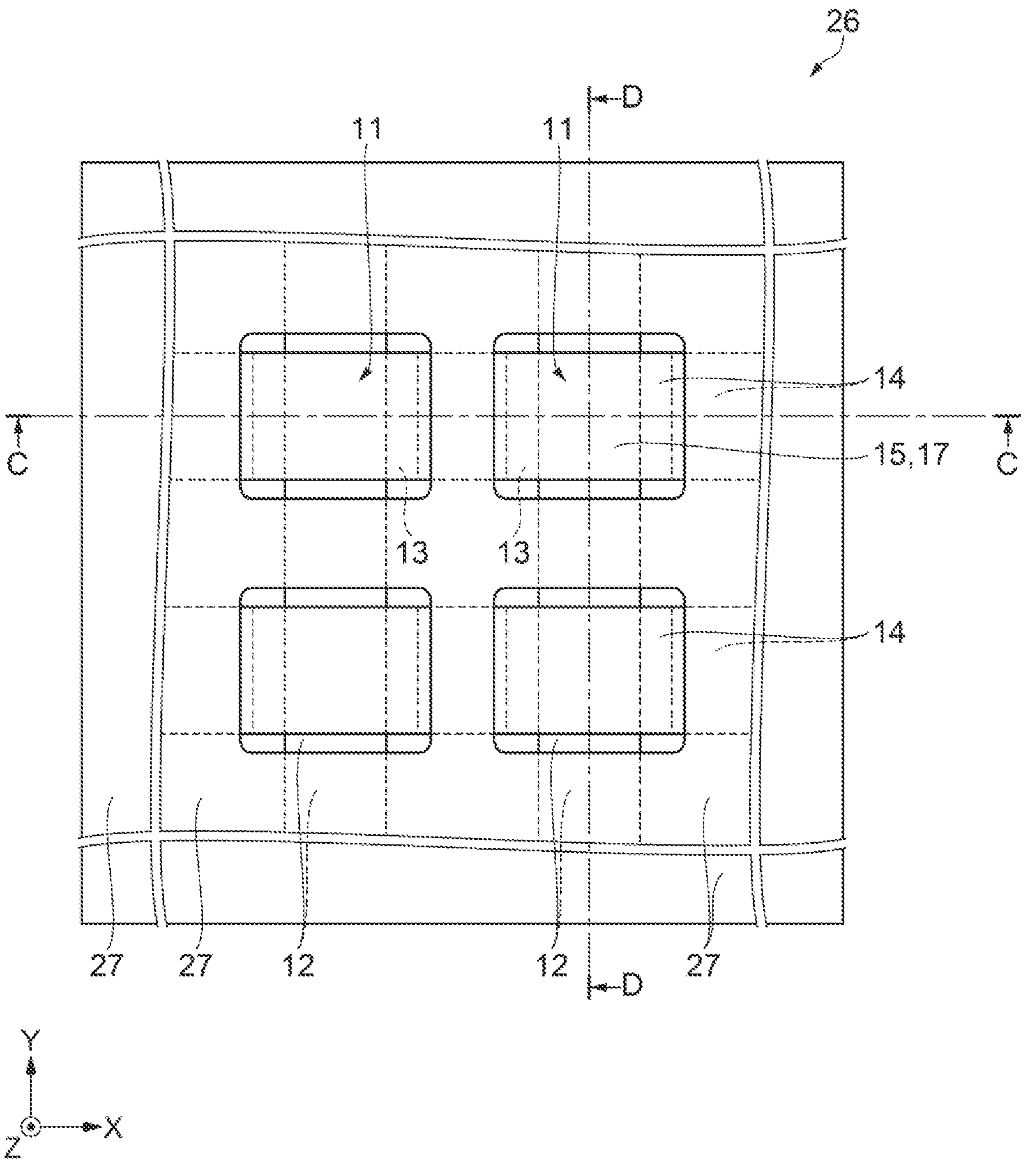
FIG. 7 is a schematic plan view illustrating an internal structure of an ultrasonic element according to the second embodiment.
Figure 8:
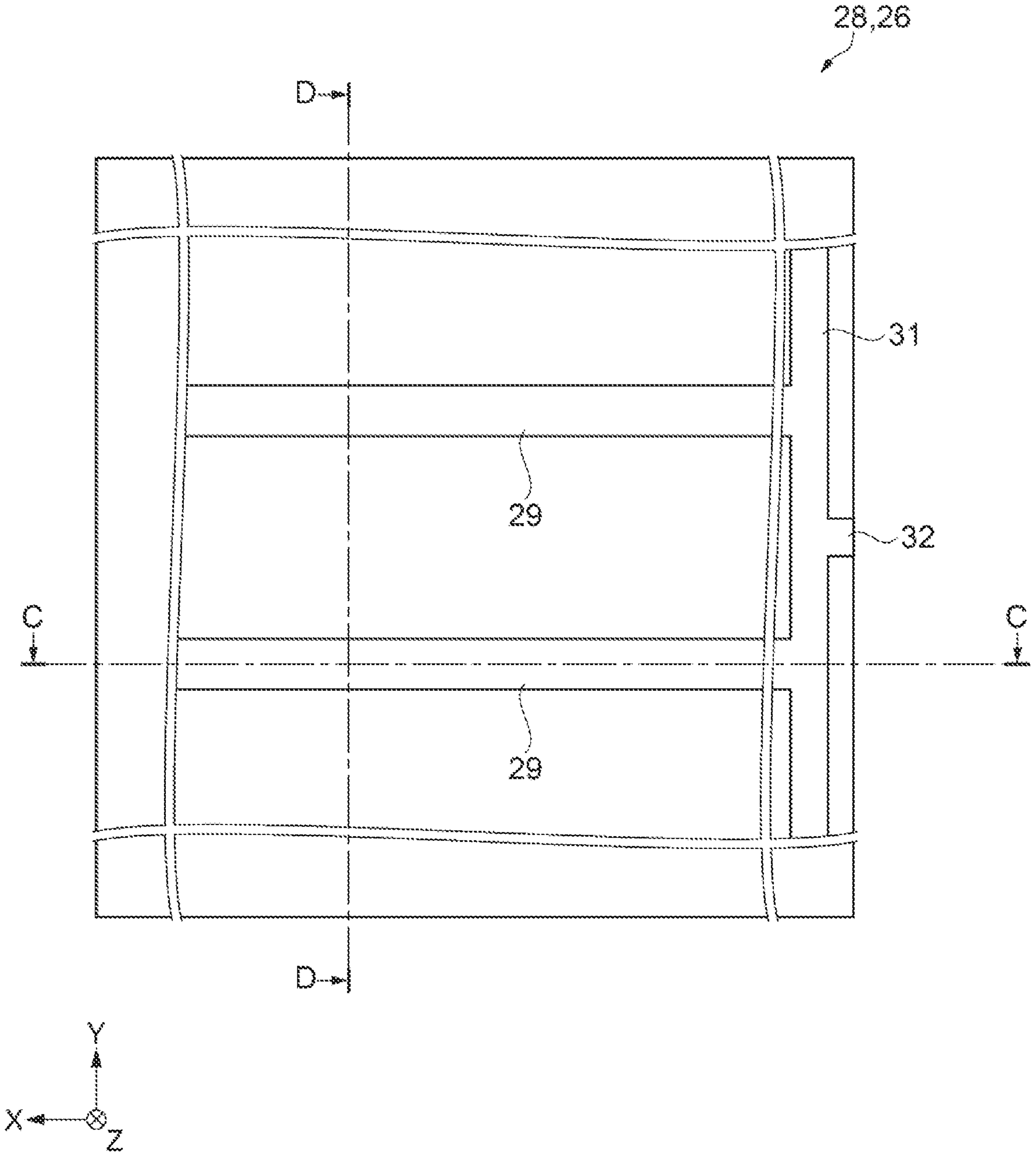
FIG. 8 is a schematic plan view illustrating a structure of a protective substrate.
Figure 9:
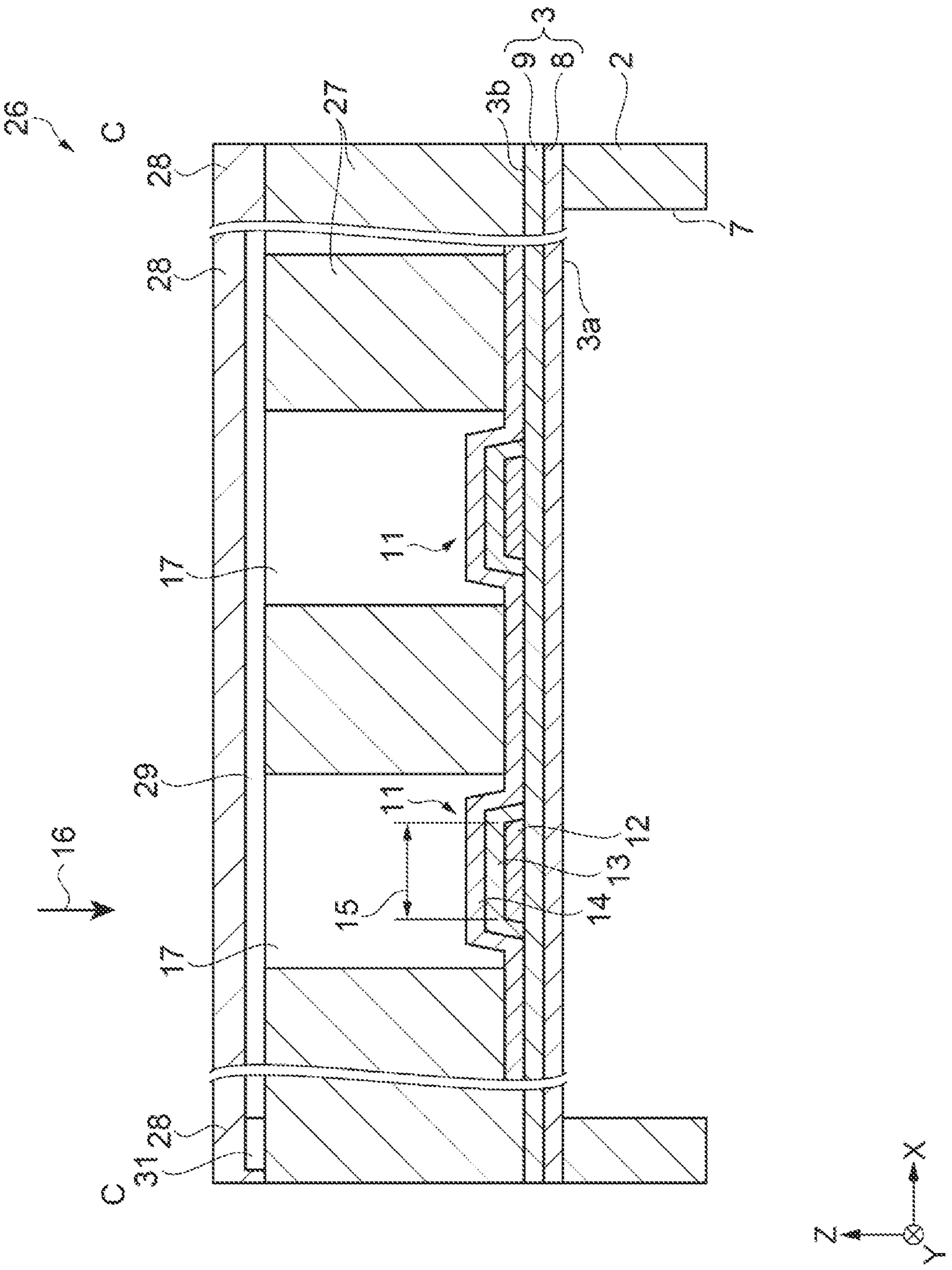
FIG. 9 is a schematic side sectional view illustrating an internal structure of an ultrasonic element.
Figure 10:
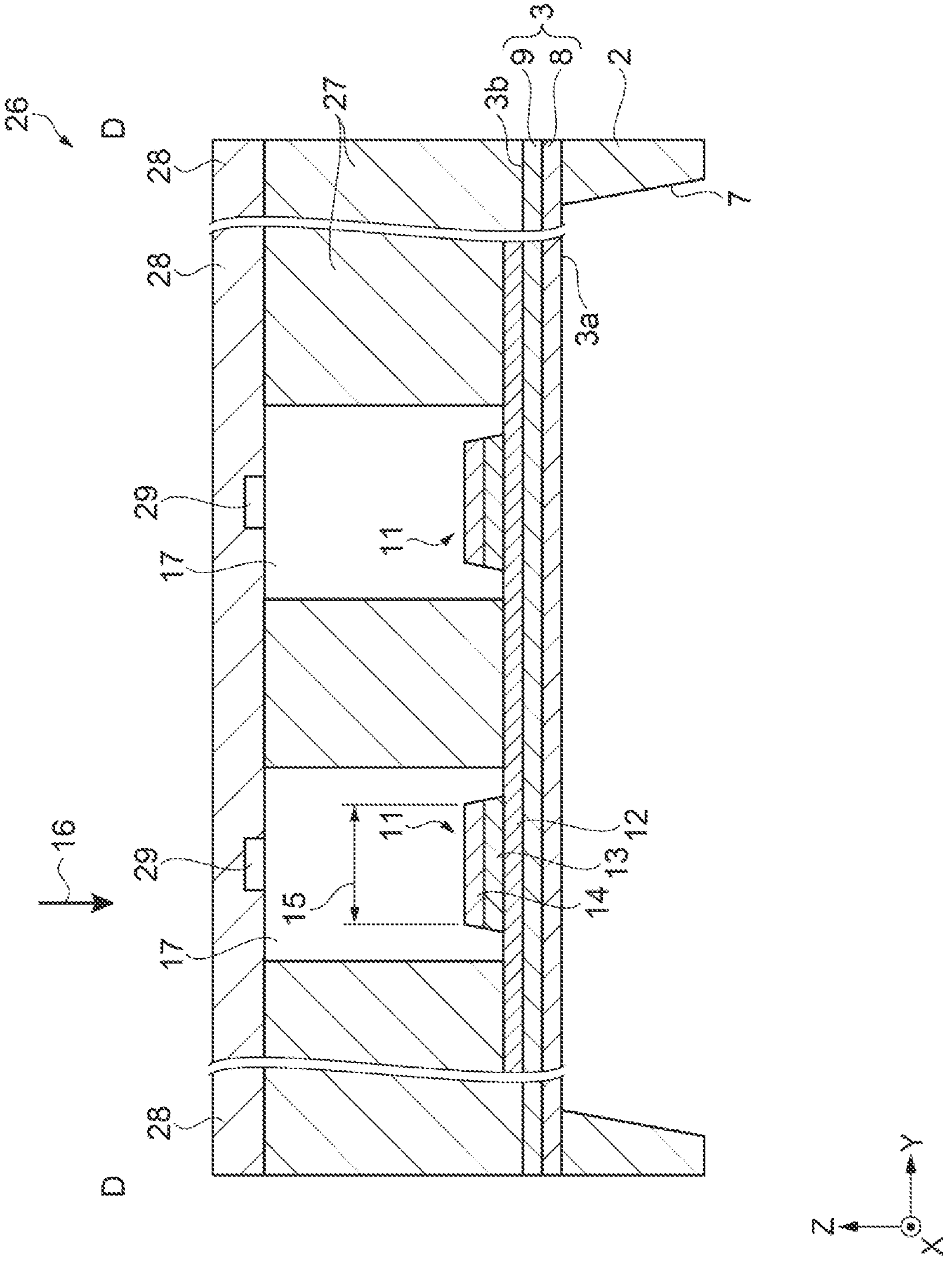
FIG. 10 is a schematic side sectional view illustrating an internal structure of an ultrasonic element.

FIG. 7 is a view of an ultrasonic element 26 from which the protective substrate is removed. FIG. 8 is a view of the protective substrate viewed from the side of the substrate 2. FIG. 9 is a view from the side of the cross-section along the line CC in FIG. 7. FIG. 10 is a view from the side of the cross-section along the line DD in FIG. 7.

In the ultrasonic element 26, a suppressing unit 27 is disposed on the vibrating plate 3, as illustrated in FIGS. 7, 9, and 10. A slit is not formed in the suppressing unit 27. A protective substrate 28 is disposed on the suppressing unit 27, as illustrated in FIGS. 9 and 10. The slit 18 is not formed in the suppressing unit 27.

A slit 29, an aeration path 31, and a ventilation hole 32 are formed in the protective substrate 28, as illustrated in FIG. 8. The internal space 17 communicates with the outside air through the slit 29, the aeration path 31, and the ventilation hole 32, as illustrated in FIGS. 8 to 10. The air pressure in the internal space 17 is the atmospheric pressure. The slit 29 has a groove shape that does not penetrate through the protective substrate 28 in the thickness direction of the protective substrate 28.

According to the configuration of the ultrasonic element 26, the active part 15 of the piezoelectric element 11 causes the vibrating plate 3 to vibrate. The suppressing unit 27 is disposed around the active part 15. The suppressing unit 27 is interposed between the vibrating plate 3 and the protective substrate 28. The slit 29 is formed in the protective substrate 28, thus the gas inside the internal space 17 enclosed by the suppressing unit 27 is movable to the outside of the suppressing unit 27. Thus, the air pressure inside the internal space 17 enclosed by the suppressing unit 27 becomes equal to the air pressure on the side of the first surface 3*a* of the vibrating plate 3, when the ultrasonic element 26 is depressurized. This makes it possible to suppress a damage to the vibrating plate 3 even when the ultrasonic element 26 is depressurized in the step for manufacturing the ultrasonic element 26. Also, the internal space 17 enclosed by the suppressing unit 27 is not sealed, which makes it possible to efficiently cause the vibrating plate 3 to vibrate.

Third Embodiment

In the third embodiment, an example of an ultrasonic device in which the ultrasonic element 1 or the ultrasonic element 26 is disposed is introduced.

Figure 11:
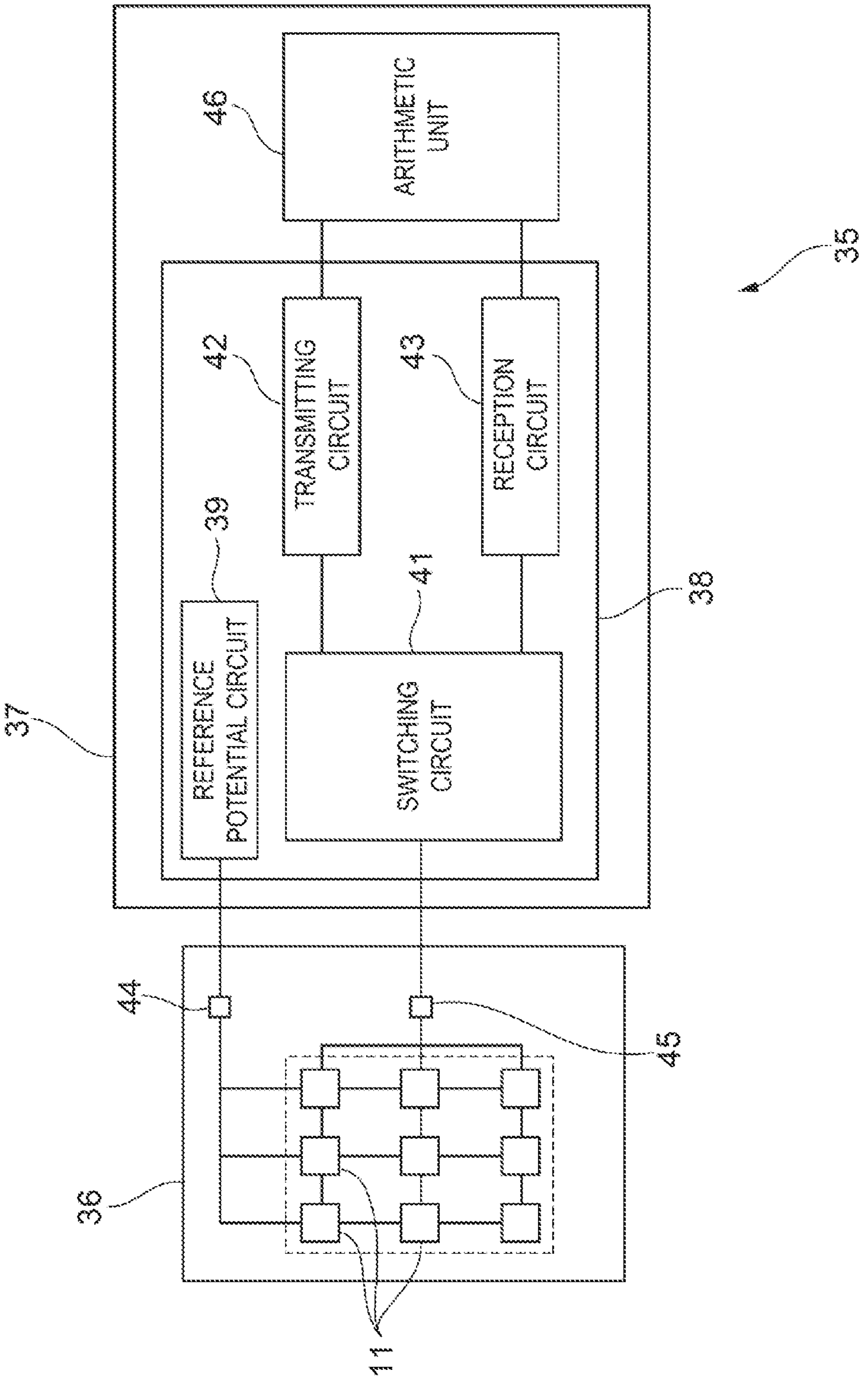
FIG. 11 is a block diagram illustrating a schematic configuration of a distance measuring device according to the third embodiment.

A distance measuring device 35 as the ultrasonic device of the third embodiment includes an ultrasonic element 36 and a control unit 37 that controls the ultrasonic element 36, as illustrated in FIG. 11. The control unit 37 includes a drive circuit 38 that drives the piezoelectric elements 11, and an arithmetic unit 46 that computes a transmission signal and a reception signal. In the distance measuring device 35, the drive circuit 38 of the control unit 37 controls the ultrasonic element 36 and the ultrasonic element 36 transmits ultrasonic waves. The control unit 37, when the ultrasonic waves are reflected by a targeted object and the ultrasonic element 36 receives the reflected waves, calculates the distance from the ultrasonic element 36 to the targeted object based on the time of the reception timing of the ultrasonic waves from the transmission timing of the ultrasonic waves.

The drive circuit 38 is a driver circuit for controlling the driving of the ultrasonic element 36, and includes a reference potential circuit 39, a switching circuit 41, a transmitting circuit 42, a receiving circuit 43, and the like.

The reference potential circuit 39 is coupled to a common electrode pad 44 of the ultrasonic element 36, and applies a reference potential to each of the piezoelectric elements 11 via wirings inside the ultrasonic element 36. The reference potential is determined so that one side of the alternating potential does not become negative.

The switching circuit 41 is coupled to a drive electrode pad 45, the transmitting circuit 42, and the receiving circuit 43. The switching circuit 41, which is constituted by a switching circuit, switches between the transmission connection for connecting the drive electrode pad 45 with the transmitting circuit 42, and the reception connection for connecting the drive electrode pad 45 with the receiving circuit 43.

The transmitting circuit 42 is coupled to the switching circuit 41 and the arithmetic unit 46. When the switching circuit 41 is switched to the transmission connection, the transmitting circuit 42 inputs a drive signal having a pulse waveform to the piezoelectric element 11 inside the ultrasonic element 36 to cause the ultrasonic element 36 to transmit ultrasonic waves based on the control of the arithmetic unit 46. Thus, the distance measuring device 35 includes the drive circuit 38 that inputs a drive signal to the ultrasonic element 36 and the piezoelectric element 11. The ultrasonic element 1 or the ultrasonic element 26 is used for the ultrasonic element 36.

The receiving circuit 43 is coupled to the switching circuit 41 and the arithmetic unit 46. When the piezoelectric element 11 receives the ultrasonic waves, the piezoelectric element 11 outputs a reception signal. At the time when the switching circuit 41 is switched to the reception connection, the receiving circuit 43 inputs a reception signal output from the piezoelectric elements 11 inside the ultrasonic element 36 and transmits the reception signal to the arithmetic unit 46 based on the control of the arithmetic unit 46.

According to the configuration of the distance measuring device 35, the piezoelectric element 11 inputs a drive signal output from the drive circuit 38, and the ultrasonic element 36 transmits ultrasonic waves. The drive circuit 38 inputs a reception signal corresponding to the ultrasonic waves received by the piezoelectric elements 11. This ultrasonic element 36 is an element configured to suppress a damage to the vibrating plate 3 and to efficiently cause the vibrating plate 3 to vibrate. Thus, the distance measuring device 35 can be served as a device provided with the ultrasonic element 36 configured to suppress a damage to the vibrating plate 3 and to efficiently cause the vibrating plate 3 to vibrate.

Fourth Embodiment

In the fourth embodiment, an example of an ultrasonic device in which the ultrasonic element 1 or the ultrasonic element 26 is disposed is introduced.

Figure 12:
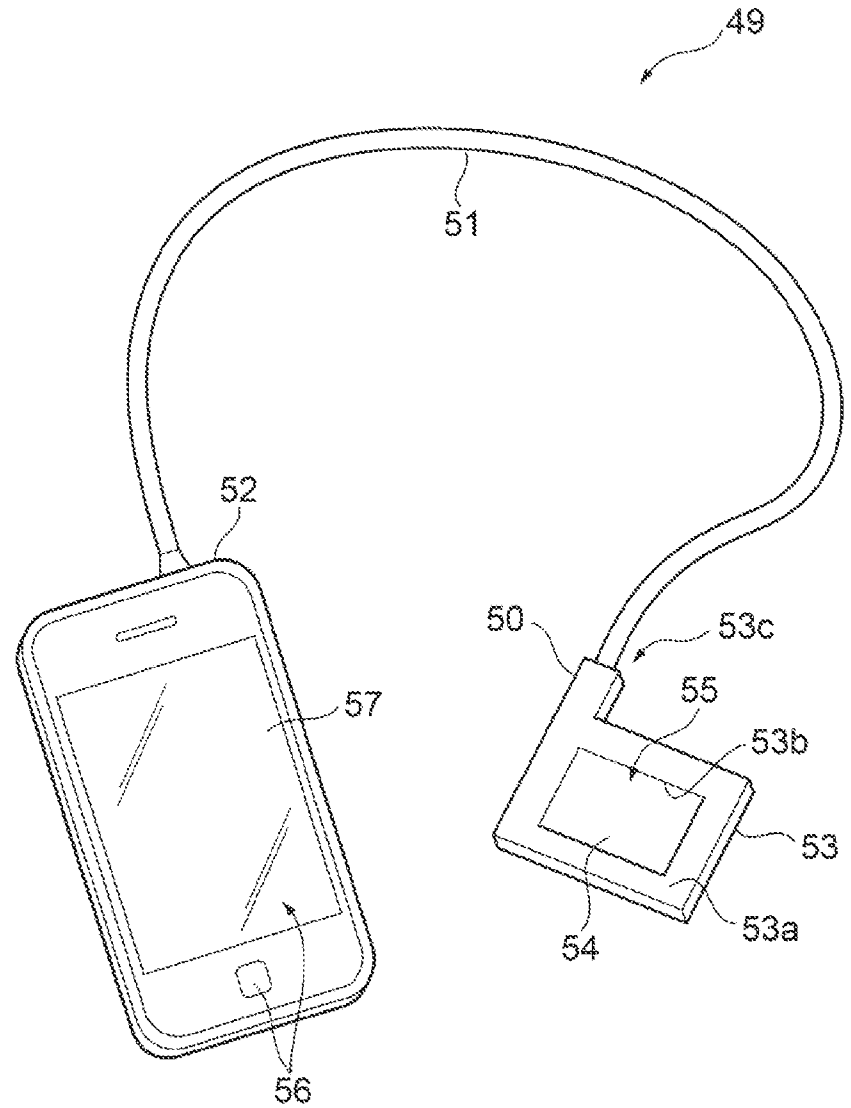
FIG. 12 is a schematic perspective view of a schematic configuration of an distance measuring device according to the fourth embodiment.

An ultrasonic measuring device 49 as an ultrasonic device includes an ultrasonic probe 50 and a controller 52 electrically coupled, via a cable 51, to the ultrasonic probe 50, as illustrated in FIG. 12. The ultrasonic probe 50 of the ultrasonic measuring device 49 is abutted against a surface of a biological body such as a human body, and the ultrasonic probe 50 sends ultrasonic waves into the biological body. Then, the ultrasonic probe 50 receives the ultrasonic waves reflected by an organ inside the biological body. The controller 52, based on the reception signal being received, forms an internal tomographic image of the inside of the biological body and measures a status of the organ, such as blood flow, inside the biological body.

The ultrasonic probe 50 corresponds to an ultrasonic wave probe. The ultrasonic probe 50 includes a housing 53, an ultrasonic element 54 housed inside the housing 53, and a circuit board provided with a driver circuit or the like for controlling the ultrasonic element 54. Note that an ultrasonic sensor 55 is configured by the ultrasonic element 54, the circuit board, and the like, and the ultrasonic sensor 55 constitutes an ultrasonic module.

The housing 53 has a rectangular box shape in plan view. A sensor window 53*b* is provided at a sensor surface 53*a* that faces one of the thickness directions of the housing 53. A part of the ultrasonic element 54 is exposed through the sensor window 53*b*. Also, a passage hole 53*c* of the cable 51 is provided at a side face of the housing 53, and the cable 51 enters the housing 53 through the passage hole 53*c* to be coupled to the circuit board inside the housing 53. The cable 51 performs communication between the controller 52 and the ultrasonic probe 50.

The controller 52 includes an operation unit 56 and a display unit 57. The operation unit 56 is a user interface (UI) for the user to operate the ultrasonic measuring device 49, and is constituted by a touch panel provided on the display unit 57, an operation button, a keyboard, a computer mouse, and the like, for example. The display unit 57 is configured by a liquid crystal display or the like, and displays an image, for example.

Figure 13:
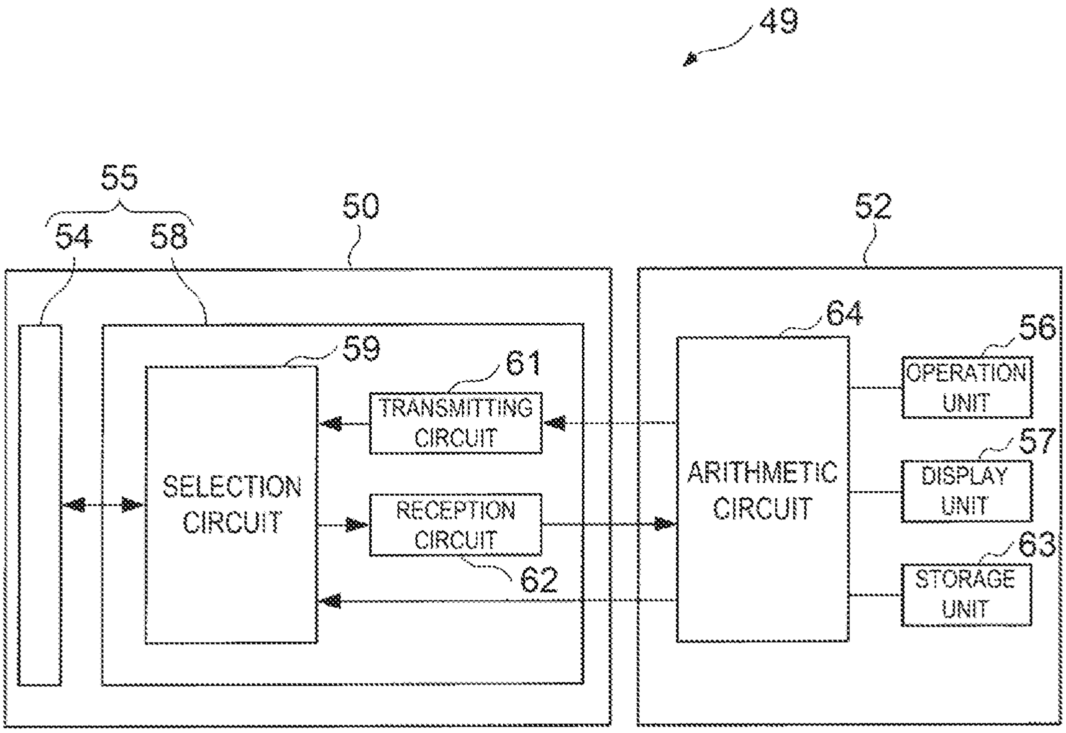
FIG. 13 is a block diagram illustrating a schematic configuration of an ultrasonic measuring device.

The ultrasonic element 54 is electrically coupled to a circuit board 58 as a drive circuit included in the ultrasonic sensor 55, as illustrated in FIG. 13. A driver circuit or the like for controlling the ultrasonic element 54 is provided at the circuit board 58. The circuit board 58 includes a selection circuit 59, a transmitting circuit 61, and a receiving circuit 62.

The first electrode 12 drawn out from each of the piezoelectric elements 11 is coupled to the selection circuit 59. The selection circuit 59, based on the control of the controller 52, switches between the transmission connection for connecting the ultrasonic element 54 with the transmitting circuit 61, and the reception connection for connecting the ultrasonic element 54 with the receiving circuit 62.

The transmitting circuit 61, when the connection is switched to the transmission connection by the control of the controller 52, outputs a transmission signal for causing the ultrasonic element 54 to transmit the ultrasonic waves via the selection circuit 59. The receiving circuit 62, when the connection is switched to the reception connection by the control of the controller 52, outputs a reception signal input from the ultrasonic element 54 via the selection circuit 59 to the controller 52. The receiving circuit 62 includes a low noise amplifier circuit, a voltage control attenuator, a programmable gain amplifier, a low pass filter, an A/D converter, and the like. The receiving circuit 62, after performing a signal processing such as a conversion from the reception signal to a digital signal, a removal of the noise component, an amplification to a desired signal level, or the like, outputs the reception signal having been processed to the controller 52.

The controller 52 includes the operation unit 56, the display unit 57, a storage unit 63, and an arithmetic unit 64. For the controller 52, a terminal apparatus such as a tablet terminal, a smartphone, a personal computer, or the like may be used, and the controller 52 may be a dedicated terminal apparatus for operating the ultrasonic probe 50, for example. The controller 52 controls each of the piezoelectric elements 11.

The storage unit 63 stores various programs and various data for controlling the ultrasonic measuring device 49. The arithmetic unit 64 is configured by an arithmetic circuit such as a central processing unit (CPU), and a storage circuit such as a memory. Then, the arithmetic unit 64 reads and executes various programs stored in the storage unit 63 to control a generation of the transmission signal and a control of an output processing on the transmitting circuit 61. The arithmetic unit 64 further performs a control, such as a frequency setting, a gain setting, and the like, of the reception signal on the receiving circuit 62.

The transmitting circuit 61 is electrically coupled with the selection circuit 59 and the arithmetic unit 64. When the selection circuit 59 is switched to the transmission connection, the piezoelectric element 11 inside the ultrasonic element 54 inputs a drive signal of pulse waveform output from the transmitting circuit 61, and the ultrasonic element 54 transmits ultrasonic waves, based on the control of the arithmetic unit 64. Thus, the ultrasonic measuring device 49 includes the circuit board 58 that inputs the drive signal to the piezoelectric element 11. The ultrasonic element 1 or the ultrasonic element 26 is used for the ultrasonic element 54.

The receiving circuit 62 is coupled to the selection circuit 59 and the arithmetic unit 64. The piezoelectric element 11, when receives the ultrasonic waves, outputs the reception signal. The receiving circuit 62, when the selection circuit 59 is switched to the reception connection, inputs a reception signal output from the piezoelectric element 11 inside the ultrasonic element 54, and transmits the reception signal to the arithmetic unit 64, based on the control of the arithmetic unit 64.

According to the configuration of the ultrasonic measuring device 49, the piezoelectric element 11 inputs the drive signal output from the circuit board 58, and the ultrasonic element 54 transmits the ultrasonic waves. The circuit board 58 inputs the reception signal, corresponding to the ultrasonic waves, that is received by the piezoelectric elements 11. This ultrasonic element 54 is an element configured to suppress a damage to the vibrating plate 3 and to efficiently cause the vibrating plate 3 to vibrate. Thus, the ultrasonic measuring device 49 can be served as a device provided with the ultrasonic element 54 configured to suppress a damage to the vibrating plate 3 and to efficiently cause the vibrating plate 3 to vibrate.

What is claimed is:

1. An ultrasonic element, comprising:
- a substrate in which an opening is formed;
- a vibrating plate provided at the substrate, the vibrating plate including a first surface in contact with the substrate, and the vibrating plate blocking the opening;
- a piezoelectric element provided at a second surface, on an opposite side from the first surface, of the vibrating plate;
- a protective substrate facing the second surface and protecting the piezoelectric element; and
- a suppressing unit provided between the protective substrate and the vibrating plate, the suppressing unit configured to suppress a vibration of the vibrating plate, wherein
  - in the piezoelectric element, a first electrode, a piezoelectric layer, and a second electrode are stacked in this order from the second surface,
  - an active part is a part of the vibrating plate where the first electrode overlaps the piezoelectric layer and the second electrode,
  - the suppressing unit is provided around the active part in plan view from a stacking direction,
  - a slit is formed in the suppressing unit, and
  - the slit allows gas inside a space enclosed by the vibrating plate, the protective substrate, and the suppressing unit to move to outside of the space and communicate with an outside atmosphere.

2. The ultrasonic element according to claim 1, wherein
- a face of the suppressing unit which faces the active part is shaped in a polygon, and
- one end of the slit is coupled with a side of the polygon, in the plan view from the stacking direction.

3. The ultrasonic element according to claim 2, wherein a corner of the polygon is formed in an arc shape.

4. An ultrasonic device, comprising the ultrasonic element according to claim 1, and a drive circuit that inputs a drive signal to the piezoelectric element.

5. An ultrasonic element, comprising:

a substrate in which an opening is formed;

a vibrating plate provided at the substrate, the vibrating plate including a first surface in contact with the substrate, and the vibrating plate blocking the opening;

a piezoelectric element provided at a second surface, on an opposite side from the first surface, of the vibrating plate;

a protective substrate facing the second surface and protecting the piezoelectric element; and a suppressing unit provided between the protective substrate and the vibrating plate, the suppressing unit configured to suppress a vibration of the vibrating plate, wherein in the piezoelectric element, a first electrode, a piezoelectric layer, and a second electrode are stacked in this order from the second surface, an active part is a part of the vibrating plate where the first electrode overlaps the piezoelectric layer and the second electrode, the suppressing unit is provided around the active part in plan view from a stacking direction, a slit is formed in the protective substrate, the slit allows gas inside a space enclosed by the vibrating plate, the protective substrate, and the suppressing unit to move to outside of the space and communicate with an outside atmosphere, and the slit has a groove shape that does not penetrate through the protective substrate.

* * * * *